United States Patent [19]

Preston

[11] 4,022,064
[45] May 10, 1977

[54] GRAVITY AND VELOCITY-CHANGE DIFFERENTIATOR

[76] Inventor: James N. Preston, 1633 W. Campbell, Phoenix, Ariz. 85015

[22] Filed: Mar. 31, 1976

[21] Appl. No.: 672,465

[52] U.S. Cl. .............................................. 73/382 R
[51] Int. Cl.² ........................................ G01V 7/12
[58] Field of Search ............ 73/503, 516 R, 517 B, 73/382; 318/676

[56] References Cited
UNITED STATES PATENTS 2,942,475  6/1960  Johnson .............................. 73/516 R Primary Examiner—James J. Gill

[57] ABSTRACT

The invention disclosed herein is comprised of an electric generator powered by an electric motor that is activated by any source of electricity so that the torque of the electric motor reacting against its stator assembly and the action of the stator of the generator resisting the magnetic force of its rotor both act to electrically indicate the differences in acceleration of gravity and other accelerations when electrically-measured by electric current-measuring means.

4 Claims, 2 Drawing Figures

GRAVITY AND VELOCITY-CHANGE DIFFERENTIATOR

The object of the invention is to provide means to electrically-measure differences in the acceleration of the earths gravity and of moving bodies travelling through space to detect minerals and water beneath the surface of the Earth and to provide a log of velocity at any given time and distance travelled through space. Electrically measuring the minute difference in gravity intensities at different places on the earths surface by the sensitive means disclosed herein indicates the existence or non-existence of water and minerals of various densities beneath the earth's surface.

Referring to the drawing.

Figure 1:
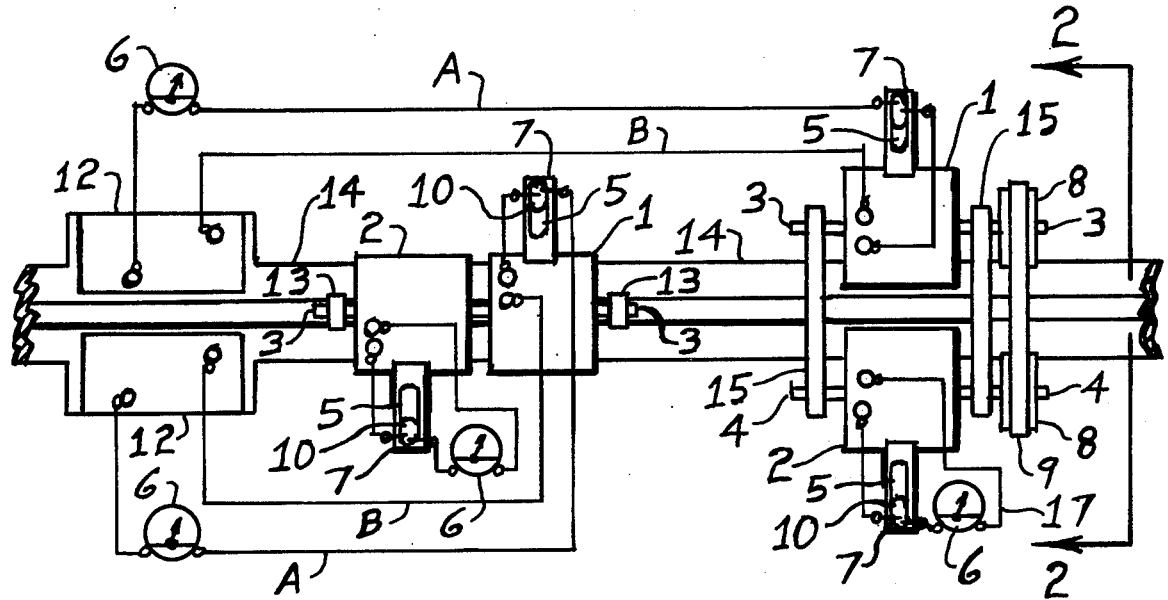
FIG. 1 shows a plan view of the device.
Figure 2:
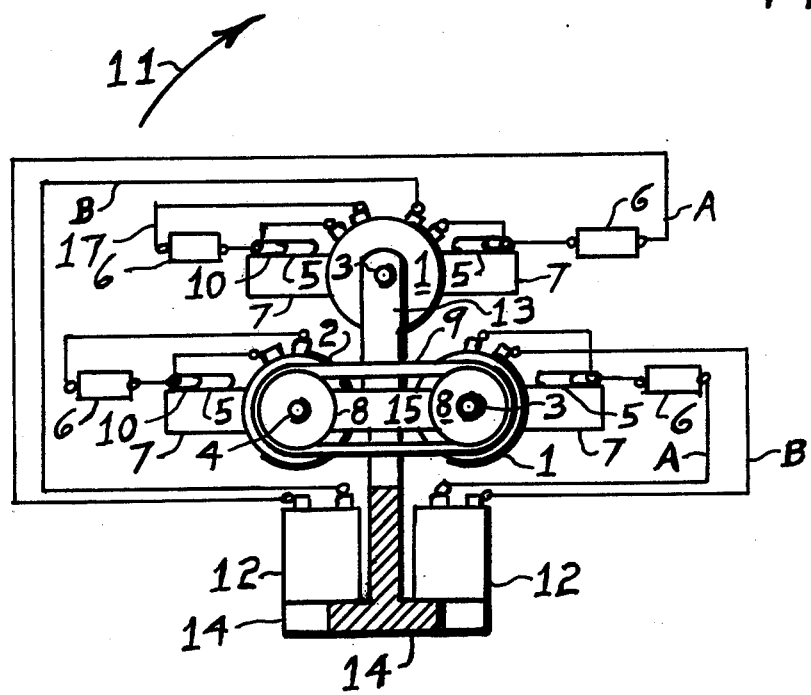
FIG. 2 shows a side view of the device as viewed along lines 2—2 of FIG. 1.

Referring to the drawing in more detail, character 1 represents an electric motor and the character 3 represents the motor axle of the electric motor. Electric current from batteries 12 flows through wires A,B to the motor 1. Electric current from the batteries 12 to the motor 1 is measured by the ampmeter 6. Character 2 represents the electric generator and character 4 represents the genrator's axle. The axle 3 of motor 1 extends through the bearing braces 15 on low-friction bearings and the pulley 8 is fastened around axle 3. The axle 4 of generator 2 similarly extends through the bearing braces 15 on low-friction bearings and the pulley 8 is fastened around axle 4 so that the pulley belt 9 conducts torque energy from the pulley 8 of motor 1 to the axle 4 of generator 2 when the motor is electrically activated by battery 12. Electric wiring 17 conducts electricity generated by the generator 2 from one terminal through to ampmeter 6 and therefrom to Mercury-type electric switch 5, thence to the other electric terminal of said generator 2. The switch 5 is fastened to arm 7 so as to electrically disconnect generator current when the arm 7 becomes horizontal each time. Arm 7 extends for a distance from 2. A similar mercury-type electric switch 5 is fastened to arm 7 to indicate when the arm 7 of motor 1 is horizontal each time whereupon disconnecting the current from battery 12 to the motor terminals; each time. The support beam 14 supports batteries 12 and bearing braces 15 fastened to the support beam 14.

Resistence to the generation of electric current operates to raise arm 7 to the horizontal level where the mercury 10 in the transparent electric swith 5 operates to electrically disconnect the electric current each time and thereby allow the arm 7 to raise no higher. Fastened to the motor 1 in similar manner as that of the generator, arm 7 carries the affixed mercury-type electric switch 5 which similarly operates to electrically disconnect the electric current from battery 12 each time when the arm 7 raises to the horizontal level each time and thus operates to prevent said arm 7 from raising any higher. In a moving body the horizontal mentioned here is regarded as being on a level perpendicular to the direction of travel. On earth, horizontal is in regard to the ground level or horizon.

Both the ampmeter of the generator 2 and the ampmeter 6 of the motor circuit A,B show differences in acceleration of a body moving through space and gravity acceleration intensity differences on different parts of the earths surface. The greater the gravity intensity registered at different spots on earth, the larger amount of electricity is required by the electric motor 1 to maintain arm 7 level and the more/electric current the mercury switch 5 of arm 7 electrically/conducts in the generator circuit through ampmeter 6. The second version of the invention is identical to the first version except that the common torque-transmitting means 3 is different than that, 8,9 of the first version. The operating of the second version of the device is identical to that of the first version. The bearing braces 13 of the second version of the device are affixed to and extend from the support beam for a distance. Both the electric motor 1 and generator indicate differences in gravity and other acceleration forces on earth and in outer space travel and can be operated with only one operable mercury electric switch between the two as well as with both switches 5 operating in the operation of the device as long as the mercury switch of either is locked in the closed position or bypassed entirely by a jumper wire. In operating the device in search of water or minerals located beneath the surface of the earth, the unit is carried from place to place over the surface of the earth through support means 14 to measure the various gravity intensities at different places thereon.

Having thus described the invention, the following is claimed:

1. A portable gravity-measuring device comprising: an electric generator having a rotor assembly and a stator assembly, the rotor assembly including an axle and the stator assembly including housing means; the axle of the rotor assembly rotatably mounted within the stator assembly on bearing means supported by the housing means; outside the stator housing means, the axle rotatably mounted on low-friction bearing means which are supported by support means of the gravity-measuring device so that the stator assembly is free to counter-rotate around the axle; the invention including an eccentric arm of some weight affixed to the stator assembly; a gravity-actuated electric switching means affixed to the eccentric arm assembly so that the force of gravity of the earth operates to close the electric switching means whenever the eccentric arm assembly rotates downward around the horizontal axle to any altitude above the surface of the earth lower than that of the horizontal plane of the axle and so that the gravity of the earth operates to open the electric switching means whenever the eccentric arm assembly is rotated upward to any altitude higher above the earth than that of the horizontal plane of the axle; the gravity-measuring device including a motor to rotate the rotor assembly of the generator through its axle; an electric circuit electrically-connecting the electrical leads of the generator together in series circuit through the gravity-actuated electric switching means and through electric energy-measuring means that operate to precisely measure and indicate the amount of electrical energy flowing through the generator circuit in the operation of the gravity-measuring device; the action of the magnetic force between the rotor and stator assemblies of the generator operating to maintain the eccentric arm in the horizontal position in the horizontal plane of the axle in opposition to the force of gravity of the earth; the operation of the gravity-actuated electric switching means operating to limit the altitude of the eccentric arm to that of the horizontal plane of the axle above the earth; the operation of the electric energy-meausring means to precisely measure the amount of electric energy generated by the generator at different locations on the surface of the earth operating to indicate differences in the amount of magnetic force required by the generator to maintain its eccentric arm in its horizontal position in opposition to the force of gravity of the earth which thereby indicates differences in the pull of the gravity of the earth on the mass of the eccentric arm thereat which indicates the presence and absence of minerals and water located beneath the surface of the earth at different locations on the surface of the earth.

2. A portable gravity-measuring device comprising: an electric motor having a rotor assembly and a stator assembly, the rotor assembly including an axle and the stator assembly including housing means; the axle of the rotor assembly rotatably mounted within the stator assembly on bearing means supported by the housing means; extending outside the stator housing means, the axle rotatably mounted on low-friction bearing means which are supported by support means of the gravity-measuring device so that the stator assembly is free to counter-rotate around the axle; the invention including an eccentric arm of some weight affixed to the stator assembly; the motor energized by electric energy from any portable source of electric energy conducted to the motor leads through electric circuit means in series circuit through a gravity-actuated electric switching means and through electric-energy-measuring means that operate to precisely measure and indicate the amount of electrical energy consumed by the motor in the operation of the gravity-measuring device; the gravity-actuated electric switching means actuated by the force of gravity of the earth to energize the electric motor whenever the eccentric arm assembly rotates downward around the horizontal axle to any altitude above the earth lower than that of the horizontal plane of the axle and to de-energize the motor whenever the eccentric arm assembly is rotated upward to any altitude above the earth higher than that of the horizontal plane of the axle; the gravity-measuring device including a torque-consuming means which is driven by the rotor assembly of the motor to cause the motor to do a certain amount of work; the action of the magnetic force between the rotor and stator assemblies of the motor operating to rotate the rotor assembly of the motor in one direction of rotation and the reaction of the magnetic force operating in the opposite direction to maintain the eccentric arm in the horizontal position in the horizontal plane of the axle in opposition to the force of gravity of the earth; at various locations above the surface of the earth, the operation of the electric energy-measuring means to precisely measure the amount of electric energy consumed by the motor operating to indicate differences in the amount of magnetic force required by the motor to maintain its eccentric arm in its horizontal position in opposition to the force of gravity of the earth which thereby indicates differences in the gravitational attraction of the earth on the mass of the eccentric arm thereat which indicates the presence and absence of minerals and water located beneath the surface of the earth at different locations on the surface of the earth.

3. A portable gravity-measuring device comprising: an electric motor and an electric generator each having a stator assembly and a rotor assembly, the stator assembly of each including housing means and the rotor assembly of each mounted in tandem on a common axle; the axle being rotatably mounted on low friction bearing means within the tandem generator stator and motor stator; extending outside the stator housing means of the motor and generator, the axle rotatably mounted on low-friction bearing means which are supported by support means of the gravity-measuring device so that the motor and generator stator assemblies are free to counter-rotate around the common axle; an eccentric arm of some weight affixed to the generator stator assembly and a similar eccentric arm affixed to the motor stator assembly; electric leads of the generator electrically-connected together through electric switching means that operate to electrically-connect the generator circuit during the time when the generator eccentric arm is located at a lower altitude than that of the horizontal plane of the horizontal axle above the earth and to electrically disconnect the generator circuit during the time when the eccentric arm is located at a higher altitude than that of the horizontal axle above the earth/by the magnetic force between rotor and stator assemblies of the generator in the operation of the invention; the motor energized by electric energy from any portable source of electric energy; electric circuit means conducting electric energy from any source of electric energy to the motor through electric energy-measuring means that operate to precisely measure and indicate the amount of electrical energy consumed by the motor in the operation of the gravity-measuring device; in one direction of rotation, the action of magnetic force between the rotor and stator assemblies of the motor operating to rotate the rotor assembly and common axle and, in the opposite direction of rotation, the magnetic force operating to maintain the eccentric arm of the motor stator assembly in the horizontal position in the horizontal plane of the axle in opposition to the force of gravity of the earth; the operation of the electric switching means of the generator operating to limit the altitude of both the motor and generator eccentric arms to that of the horizontal plane of the axle above the earth; variations in the gravitational pull of the earth on the generator eccentric arm at different locations above the earth surface operation to vary the torque load of the generator on the motor which operates to vary the electric consumption of the motor at the same time that variations in the gravitational pull of the earth on the motor eccentric arm operates to vary the electric energy consumption of the motor; with magnetic action raising the generator arm and magnetic reaction raising the motor arm, variations in the electric energy consumption of the motor operating to indicate through the electric energy-measuring means the variations in gravity intensity of the earth thereat.

4. A portable gravity-measuring device comprising: an electric motor having a rotor assembly and a stator assembly, the rotor assembly including an axle and the stator assembly including housing means; the axle of the rotor assembly rotatably-mounted within the stator assembly on bearing means supported by the housing means; extending outside the stator housing means, the axle rotatably mounted on low-friction bearing means which are supported by support means of the gravity-measuring device so that the stator assembly is free to counter-rotate around the motor axle; an eccentric arm of some weight affixed to the stator assembly; electric circuit means electrically-connecting the motor leads to any portable source of electric energy through gravity-actuated electric switching means that are normally-closed to energize the motor; the normally-closed gravity-actuated electric switching means actuated by the force of gravity of the earth to de-energize the electric motor each time that the force of magnetic energy of the motor swings the eccentric arm assembly upward around the motor axle to an altitude above the earth equal to that of the horizontal plane of the motor axle; the gravity-measuring device including an electric generator mounted through support means to the invention so that its rotor assembly is rotated by the rotor assembly of the motor through torque-transmitting means; electric circuit means electrically-connecting the electric leads of the generator together through electric energy measuring means that operate to precisely measure and indicate the amount of electrical energy flowing through the generator circuit in the operation of the gravity-measuring device; the action of the magnetic force between the rotor and stator assemblies of the motor operating to drive the rotor assembly of the motor in one direction of rotation while the reaction to that same magnetic force of the motor operating to swing the motor stator and eccentric arm assembly in the opposite direction of rotation until the eccentric arm assembly is lifted in elevation to an altitude equal to that of the horizontal motor axle above the earth where the eccentric arm is limited to that altitude by the gravity-actuated electric switching means in the operation of the invention; by operating to precisely measure the amount of electric energy generated by the generator, the electric energy-measuring means of the generator operates to precisely measure slight changes in the amount of electric energy required by the invention to electromagnetically maintain the eccentric arm of the motor in the horizontal position against the force of the earths gravity and so operates to precisely measure small differences in the pull of gravity of the earth on the mass of the eccentric arm of the motor at various locations above the surface of the earth to thereby indicate the presence and absence of minerals and water located beneath the surface of the earth at various points above the surface of the earth.

* * * * *